United States Patent Office 3,442,836
Patented May 6, 1969

3,442,836
VINYLIDENE CHLORIDE COPOLYMER COATING COMPOSITION FOR WATER-SENSITIVE ORGANIC POLYMER FILM
Frederick Peter Barry, Clinton, Iowa, assignor to E. I. du Pont de Nemours and Company, Wilmington, Del., a corporation of Delaware
No Drawing. Filed Nov. 30, 1965, Ser. No. 510,696
Int. Cl. C08f 29/14; C09d 5/02, 3/74
U.S. Cl. 260—23                     6 Claims

ABSTRACT OF THE DISCLOSURE

A vinylidene chloride copolymer coating composition for coating water-sensitive organic polymer film, e.g., regenerated cellulose film, comprising as essential ingredients in avolatile organic solvent solution of copolymer from about 2 to 6 parts by weight of candelilla wax, and from 1 to 3 parts by weight of calcium or ammonium stearate per 100 parts by weight of copolymer, and from 0.1% to 0.5% of water based on the total weight of the solution.

This invention relates to a novel coating composition for application on water-sensitive, organic polymer film, and to water-sensitive, organic polymer film coated with such composition. More particularly, this invention relates to the provision of regenerated cellulose film having a novel vinylidene chloride copolymer coating composition characterized by improved heat-seal, cold peel, crimp seal, and release performance characteristics, and to the novel coating composition.

In the development of coated cellophane and like water-sensitive organic polymer films for wrapping articles of commerce in automatic packaging machinery, and particularly, cellophane films carrying vinylidene chloride copolymer coating, formulations have been developed to improve the release properties of the vinylidene chloride copolymer coated cellophane from sealing jaws of the packaging equipment. Such modified polymer coatings on cellophane films have given trouble-free operation in automatic packaging machines equipped with smooth sealing bars as well as those equipped with crimped sealing bars. However, shortcomings have been uncovered in some of these modified coatings. In particular, there has been a tendency for such coated films to be somewhat deficient in heat seal level as well as cold peel performance.

It is, therefore, an object of this invention to provide a vinylidene chloride copolymer coated water-sensitive, organic polymer film, e.g., cellophane film, having satisfactory crimp sealing performance, release performance on automatic packaging equipment as well as a satisfactory heat seal and cold peel level of performance. The foregoing and related objects will more clearly appear from the detailed description which follows.

These objects are realized by the present invention which, briefly stated, comprises, as a coating composition for water-sensitive organic film, a composition comprising essentially a 10 to 25% solids, volatile organic solvent solution of (1) 100 parts by weight of a vinylidene chloride copolymer containing at least 87% by weight of vinylidene chloride; (2) from about 2 to 6 parts by weight of candelilla wax per 100 parts by weight of said copolymer; and (3) from 1 to 3 parts by weight of a stearate salt selected from the group consisting of calcium and ammonium stearates; said solution containing between 0.1% and 0.5% of water, based on the total weight of the solution.

In the preferred embodiment of this invention the base film is regenerated cellulose and will customarily contain a softener or mixture of softeners for the film generally in an amount between 10 and 30% by weight, based on the weight of the cellulose. In order that the coating be firmly adherent to the regenerated cellulose base sheet the latter will also customarily contain an anchoring resin in an amount between 0.01 and 1% by weight based on the weight of the cellulose. Such resins include the polyalkylenimines such as polyethylenimine and polypropylenimine and the heat curable resins such as urea-formaldehyde, guanidine-urea-formaldehyde, melamine formaldehyde and melamine formaldehyde-polyalkylene polyamide resins.

The additional inclusion in the coating composition of from about 0.5 to 2.5 parts by weight of a saturated or olefinically unsaturated amide or ketone containing between 18 and 26 carbon atoms, e.g., stearamide, erucamide, or dilauryl ketone, serves to further improve the antiblocking characteristics of the film by counteracting the adverse effects of the stearate salt, and such inclusion constitutes a preferred embodiment of the coating composition herein. It is especially preferred that this material be stearamide and that it be used in the amount of 1 to 2 parts by weight per 100 parts of vinylidene chloride copolymer.

In addition to their preferred application as a coating for cellophane (regenerated cellulose films), these coatings can be used to the same effect on other water-sensitive films such as those of methyl cellulose, ethyl cellulose, hydroxyethyl cellulose, hydroxypropyl cellulose, polyvinyl alcohol, and partially hydrolized ethylene/vinyl acetate polymers and copolymers. By water sensitive it is meant that the film will swell to at least 1% when immersed in water. Those compositions are also useful for coating laminated structures containing two or more sheets of regenerated cellulose or a similar water-sensitive organic polymer films.

The copolymers of vinylidene chloride preferred for purposes of the invention are those containing at least 87% by weight, of vinylidene chloride, based on the total weight of the polymer, and one or more ethylenically unsaturated monomers copolymerizable therewith. Representative mono-olefinic monomers copolymerizable with vinylidene chloride include: acrylic acid, methyl, ethyl, isobutyl, butyl, octyl and 2-ethyl hexyl acrylates and methacrylates; phenyl methacrylate, cyclohexyl methacrylate, p-cyclohexylphenyl methacrylate, methoxyethyl methacrylate, chloroethyl methacrylate, 2-nitro-2-methylpropyl methacrylate and the corresponding esters of acrylic acid; methyl alpha-chloroacrylate, octyl alpha-chloroacrylate, methyl isopropenyl ketone, acrylonitrile, methacrylonitrile, methyl vinyl ketone, vinyl chloride, vinyl acetate, vinyl propionate, vinyl chloroacetate, vinyl bromide, styrene, vinyl naphthalene, ethyl vinyl ether, N-vinyl phthalimide, N-vinyl succinimide, N-vinyl carbazole, isopropenyl acetate, acrylamide, methacrylamide and alkyl substitution products thereof, phenyl vinyl ketone, diethyl fumarate, diethyl maleate, methylene diethyl malonate, dichloro-vinylidene fluoride, itaconic acid, dimethyl itaconate, diethyl itaconate, dibutyl itaconate, vinyl pyridine, maleic anhydride, allyl glycidyl ether and other unsaturated aliphatic ethers described in U.S. Patent 2,160,943. The compounds may be generally defined as vinyl or vinylidene compounds having a single $CH_2=C<$ group. The most useful monomers fall within the general formula

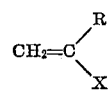

where R may be hydrogen, halogen, or unsaturated aliphatic radical, and X is a member of the group consisting of —Cl, —Br, —F, —CN, —C₆H₅, —COOH,

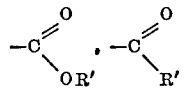

—HC=O, —NH, OC₆H₅, —CO₂, —CONH—R' and

—CONR'₂ in which R' is alkyl.

As indicated, candelilla wax content of the coating composition may range from 2 to 6 parts by weight of candelilla wax per 100 parts of vinylidene chloride copolymer. When candelilla wax is used in an amount less than 2 parts by weight crimp jaw release of the coated film is not satisfactory and if amounts in excess of 6 parts by weight are used the haze level of the coated film is excessively high.

The calcium or ammonium stearate is used in an amount ranging from 1 to 3 parts by weight per 100 parts by weight of vinylidene chloride copolymer. Amounts of the stearate salt in excess of 3 parts by weight have the adverse effects of undesirably increasing the viscosity of the coating lacquer and tending to cause the coated film to block, that is, of causing adjacent layers of film in a roll or stack of sheets to adhere or bond to one another.

The coating should also include between about 0.1 and 1 part by weight of an organic carboxylic acid to effect lowering the viscosity of the coating lacquer and of controlling the viscosity to a value satisfactory for use in typical coating equipment. A wide variety of mono- and polyfunctional, saturated and olefinically unsaturated, unsubstituted and hydroxy substituted carboxylic acids have been found satisfactory. Examples of suitable acids include tartaric, citric, itaconic, maleic, fumaric, lactic, gluconic and formic acids, and maleic anhydride.

The coating composition of this invention additionally may include from 0.05 to 2 parts by weight per 100 parts of vinylidene chloride copolymer of a solid particulate material. The particulate material serves the purpose of improving the antiblocking properties of the film and improves the film-to-film slip. The particulate used should be chemically inert and insoluble in the coating and in the coating solvents. Suitable materials are numerous and include, for example, talc in amounts between about 0.2 and 1.0 part and by weight preferably between 0.3 and 0.5 part, bentonite clay in amounts between 0.05 and 0.2 part by weight, and mica in amounts between about 0.5 and 2.0 parts by weight, in all cases for 100 parts by weight of vinylidene chloride copolymer. Below the respective lower limits, the slip of the film is inadequate, while above the upper limits the film becomes hazy. It is especially preferred that the particulate material be talc and further that it be used in the amount of 0.3 to 0.5 part by weight per 100 parts of vinylidene chloride copolymer.

Additionally, the films coated with coating compositions of this invention may be sized with a conventional wetting agent for film, e.g., sodium lauryl sulfate. This after size coating is for the purpose of making the film non-fogging and to improve to some degree the sliding properties of the film so that it will tend to run more smoothly in printing presses and in packaging machines. It is to be emphasized that the coated films of this invention process satisfactory crimp jaw release properties whether after sized or not. The amount of after size applied will generally be between about 1 and 30 milligrams/sq. meter.

The coating composition is applied from any of the well known low-boiling solvents or solvent systems heretofore employed in the application of vinylidene chloride copolymer coatings. An especially useful combination is a solvent system consisting of tetrahydrofuran and toluene. The coating lacquer is made up to contain between 10 and 25% total solids. Although the coating lacquer may be prepared in any appropriate way, it can be conveniently prepared by mixing all of the solids other than the copolymer in a fraction of, say toluene, of the solvent system (during which mixing the soluble ingredients, such as the candelilla wax, dissolve while the insoluble particulate material is thoroughly wetted and dispersed) and adding this mixture, together with the specified proportion water, to a previously prepared solution of the copolymer in the balance of the toluene and other solvent, e.g., tetrahydrofuran. In order to insure thorough blending of the constituents and to prepare a lacquer in optimum condition for coating, it is preferred to stir the mixture for at least one hour at a temperature of 45°–55° C. The lacquer is applied to the base sheet by any of the various coating methods known to the art, such as by dipping, use of kiss rolls, or sparying followed by removal of excess lacquer as with doctor rolls, doctor knives or air knives, or by gravure roll coating. The coating may be applied to one or both surfaces of the base sheet or film. The coating weight will generally be between 2 and 6 g./sq. meter, and more often between 3 to 4 g./sq. meter. The solvent is conveniently removed by passing the film through a heated compartment.

The following examples will serve to further illustrate the practice and principles of this invention.

Examples 1 and 2

The procedure followed in each example is, in general, the same. The coating bath is prepared as follows: Into 182 parts of toluene held between 40° C. and 50° C. there is placed 100 parts of a polymer consisting of 91.5 parts of vinylidene chloride, 6 parts of acrylonitrile, 2 parts of methyl methacrylate, and 0.5 part of tartaric acid and the mixture is slurried for 30 minutes. To this slurry there is added 275 parts of tetrahydrofuran and the mixture is stirred while the temperature is held between 40° C. and 50° C. until solution is complete which requires about 20 minutes. In a separate container there is placed 43 parts of toluene, 2 parts of refined candelilla wax, 2 parts of calcium stearate, 2 parts of stearamide, 0.5 part of the glycerol ester of maleic anhydride treated rosin and 0.3 part of pulverized talc and the mixture is stirred for 30 minutes at 100° C. until the wax-rosin derivative and calcium stearate are dissolved and the talc is throughly slurried. The latter mixture and 1.5 parts of water are added to the polymer solution and the mixture is stirred for on hour at 40° C.–50° C. A regenerated cellulose base sheet containing about 15% glycerol and 0.40% of a melamine/formaldehyde resin is coated with this coating lacquer and then dried. The effect of different water contents in the coating bath is shown in tabular form below.

TABLE

| Example | Percent water in bath[1] | Bath temperature, (° C.) | Heat seal | Cold peel | Coating thickness | Percent moisture in film | Percent film haze |
|---|---|---|---|---|---|---|---|
| 1 | 0.25 | 40 | 212 | 151 | 3.7 | 5.9 | 3.3 |
| 2 | 0.5 | 40 | 309 | 196 | 3.6 | 6.9 | 5.6 |
| Control | 0 | 40 | 127 | 39 | 3.2 | 6.7 | 2.7 |

[1] Total bath weight basis.

It will be observed that the film of Example 2 shows very excellent heat seal and cold peel performance, but the relatively high haze value shows the effect of the high moisture content in the coating bath. On the other hand, the control experiment with no water in the coating bath showed a very excellent haze value but the heat seal level and cold peel level were low. In sustained production experience, it is found that as much as 38% of the heat seal values are below 150 grams which is considered to be the minimum level that can be tolerated in film for varied packaging uses. On the other hand, film made on the production basis over a prolonged period using the bath formulation illustrated in Example 1 shows no heat seal values below 150 grams and the haze value of 3.3% is acceptable for most film uses. The reason for the improvement in heat seal and cold peel performance of the coated film through the addition of water to the coating bath is not well understood. It is speculated that the presence of water may effect the liberation of acidic material from the polymeric materials and that this acidic material may enhance the bonding of the coating material to the base film. In view of the known detrimental effect of moisture on adherence of the various coatings to water sensitive base films, the result achieved by this invention are indeed unexpected.

Cold peel test

The cold peel test is conducted by attempting to lift the coating from the base film with a sharp edge instrument such as a knife. After a portion of the coating is lifted, a 1 inch wide strip of adhesive tape is attached to the loosened strip which is then pulled off at an angle of 180° and the force required to pull off the strip of coating is recorded.

Heat seal

Heat seal strength is measured on the coated film after it has been conditioned for 3 days at 81% relative humidity at 90° F., by cutting a piece of the film 4" by 10" with the grain running in the long or machine direction into 2 pieces 4" by 5" each. The two pieces superimposed so that opposite surfaces are in contact, are then sealed together at each end at right angles to the grain. A ¾ inch wide sealing bar heated to a temperature of 140° C. at 5 p.s.i. pressure contacts the ends for ¼ second. The sealed sheets are then cut in half at right angles to the grain. From the center of the two resulting pieces 1½ inch wide strips parallel to the grain are cut. The resulting 4 sets of strips are tested by opening each set of strips at the free ends, placing them in a Suter Tester and pulling them apart. The highest force in grams required to pull the strips apart is taken as a measure of the heat seal bond strength.

The films of Examples 1 and 2 showed no evidence of crimp jaw sticking as indicated by the fact that the force required to remove the film from the sealing jaws was substantially zero. The test of crimp jaw release property is carried out as follows: Two films each 6 inches wide are sealed together between crimped sealing jaws to form a sealed area measuring 6" by 0.5"; the sealed films are pulled away from the jaws around a freely suspended roll mounted on a strain gage which is in turn connected to a recorder; the force necessary to remove the film from the sealing jaws is automatically recorded.

Example 3

The coating bath is prepared in the same way as described in Examples 1 and 2 except that the vinylidene chloride copolymer consists of 90.8 parts of vinylidene chloride, 9.0 parts acrylonitrile and 0.2 parts of itaconic acid. To the coating bath there is added 1.5 parts of water, and the resulting bath is coated on a regenerated cellulose base sheet containing 15% glycerol and 0.40% of a melamine/formaldehyde resin. The resulting coated film shows substantially the same heat seal, cold peel and crimp jaw release characteristics as the coated films described under Example 1.

Example 4

The coating bath is made as described in Examples 1 and 2, except that the vinylidene chloride copolymer consists of 90 parts of vinylidene chloride, 9.5 parts of methylacrylate and 0.5 part of itaconic acid. The coating bath containing 1.5 part of water was coated onto a regenerated cellulose base film similar to that described in the proceeding examples. The heat seal, cold peel and crimp jaw release characteristics of the coated film are substantially the same as those shown in Example 1.

What is claimed is:

1. A coating composition suitable for coating water-sensitive organic polymer film comprising essentially a 10 to 25% solids, volatile organic solvent solution of (1) 100 parts by weight of a copolymer of vinylidene chloride and at least one other ethylenically unsaturated monomer copolymerizable therewith said copolymer containing at least 87% by weight of vinylidene chloride; (2) from about 2 to 6 parts by weight of candelilla wax per 100 parts by weight of said copolymer; and, (3) from 1 to 3 parts by weight of a stearate salt selected from the group consisting of calcium and ammonium stearates, said solution containing between 0.1% and 0.5% of water, based on the total weight of the solution.

2. The composition of claim 1 wherein said copolymer consists of 91.5 parts by weight, based on the weight of copolymer, of vinylidene chloride, 6 parts by weight of acrylonitrile, 2 parts by weight of methyl methacrylate, and 0.5 part by weight of tartaric acid.

3. The composition of claim 1 containing, in addition, from about 0.5 to 2.5 parts by weight per 100 parts of said copolymer of a compound selected from the group consisting of saturated and olefinically unsaturated amides and ketones containing 18 to 26 carbon atoms.

4. The composition of claim 3 wherein the added constituent is stearamide.

5. The composition of claim 1 containing, in addition, from 0.05 to 2 parts by weight, per 100 parts of vinylidene chloride copolymer, of solid particulate material.

6. The composition of claim 5 wherein the particulate material is talc in an amount of 0.3 to 0.5 part by weight per 100 parts of vinylidene chloride copolymer.

References Cited

UNITED STATES PATENTS 3,375,215    3/1968    Kane _____ 260—23

DONALD E. CZAJA, *Primary Examiner.*

R. W. MULCAHY, *Assistant Examiner.*

U.S. Cl. X.R.

260—27, 28.5, 30.4, 31.2, 32.6, 32.8, 41; 117—145

UNITED STATES PATENT OFFICE
CERTIFICATE OF CORRECTION

Patent No. 3,442,836                                            May 6, 1969

Peter Frederick Barry

It is certified that error appears in the above identified patent and that said Letters Patent are hereby corrected as shown below:

In the heading to the printed specification, line 5, "Frederick Peter Barry" should read -- Peter Frederick Barry --. Column 1, line 18, "avolatile" should read -- a volatile --. Column 2, line 35, "a" should read -- of --. Column 3, line 8, "-CH=O, -NH, $OC_6H_5$, $-CO_2$, -COHN-R' and" should read -- -HC=O, $=OC_6H_5$, $-COHN_2$, -COHN-R' and --. Column 4, line 15, after "proportion" insert -- of --; line 55, "on" should read -- one --.

Signed and sealed this 14th day of April 1970.

(SEAL)
Attest:

Edward M. Fletcher, Jr.                            WILLIAM E. SCHUYLER, JR.

Attesting Officer                                          Commissioner of Patents